United States Patent
Tai et al.

(10) Patent No.: US 11,766,657 B2
(45) Date of Patent: Sep. 26, 2023

(54) CALCINED HIERARCHICAL POROUS COMPOSITE

(71) Applicant: National Tsing Hua University, Hsinchu (TW)

(72) Inventors: Nyan-Hwa Tai, Hsinchu (TW); Yi-Ting Lai, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 227 days.

(21) Appl. No.: 17/241,381

(22) Filed: Apr. 27, 2021

(65) Prior Publication Data

US 2022/0193632 A1 Jun. 23, 2022

(30) Foreign Application Priority Data

Dec. 22, 2020 (TW) .................................. 109145418

(51) Int. Cl.

| | | |
|---|---|---|
| *B01J 20/24* | (2006.01) | |
| *B01J 20/20* | (2006.01) | |
| *B01J 20/04* | (2006.01) | |
| *C02F 1/28* | (2023.01) | |
| *B01J 20/30* | (2006.01) | |
| *C02F 101/10* | (2006.01) | |

(52) U.S. Cl.
CPC ............. *B01J 20/24* (2013.01); *B01J 20/041* (2013.01); *B01J 20/20* (2013.01); *B01J 20/3078* (2013.01); *C02F 1/288* (2013.01); *C02F 1/283* (2013.01); *C02F 1/286* (2013.01); *C02F 2101/105* (2013.01)

(58) Field of Classification Search
None
See application file for complete search history.

(56) References Cited

U.S. PATENT DOCUMENTS

| | | | |
|---|---|---|---|
| 9,957,171 B2 | 5/2018 | Chung et al. | |
| 10,035,131 B2* | 7/2018 | Pradeep | ............. B01J 20/28007 |
| 10,421,875 B2* | 9/2019 | Casiraghi | ............... C01G 41/00 |
| 2021/0077980 A1* | 3/2021 | Yang | ........................ B01J 20/06 |

FOREIGN PATENT DOCUMENTS

| | | |
|---|---|---|
| CN | 104707571 A | 6/2015 |
| TW | 201524913 A | 7/2015 |

OTHER PUBLICATIONS

CN 109173485 A (English Language Abstract). (Year: 2019).*
CN 108676616 A (English Language Abstract). (Year: 2018).*
Ahmed et al., A Prospect for Environmental Remediation of Perchlorate via Cost-Effective Pinus Leaves and Dandelion Flower Powder-based Layer Double Hydride (LDH) Sorbents, Arabian Journal of Chemistry, vol. 13, pp. 5181-5190 Mar. 18, 2020.

* cited by examiner

*Primary Examiner* — Joseph D Anthony
(74) *Attorney, Agent, or Firm* — Hamre, Schumann, Mueller & Larson, P.C.

(57) ABSTRACT

A calcined hierarchical porous composite includes a carbon-based material, a bio-carrier material including biflavonoid and triterpenoid, and a layered double hydroxide. The carbon-based material includes graphene oxide, reduced graphene oxide, and a combination thereof. The bio-carrier material includes biflavonoid and triterpenoid, and is configured for carrying the carbon-based material therein so as to form a precursor structure. The layered double hydroxide has phosphate-specific active sites, and is formed on the precursor structure. A method for making the calcined hierarchical porous composite is also disclosed.

9 Claims, No Drawings

CALCINED HIERARCHICAL POROUS COMPOSITE

CROSS-REFERENCE TO RELATED APPLICATION

This application claims priority of Taiwanese Invention Patent Application No. 109145418, filed on Dec. 22, 2020.

FIELD

The disclosure relates to a composite, and more particularly to a calcined hierarchical porous composite for removal of phosphate from wastewater.

BACKGROUND

Phosphate causes water eutrophication, and is often present in industrial, agricultural, and domestic wastewater. Additionally, phosphate is becoming increasingly scarce since it is widely applied in various industries, notably in agriculture. Therefore, it is necessary to develop techniques that can separate, remove, and recycle phosphate from wastewater so as to not only reduce its impact on the environment but also produce more resources of phosphate. Taiwanese Invention Patent Application Publication No. 201524913A, which is the counterpart application of U.S. Pat. No. 9,957,171B2, discloses a conventional composite for removal of phosphate from wastewater. The conventional composite includes a carbon support and a layered double hydroxide immobilized on the carbon support. The carbon support includes, for example, activated carbon, bamboo charcoal, carbon nanotube, graphene, or acetylene black. The layered double hydroxide is, for example, MgMn-layered double hydroxide, ZnAl-layered double hydroxide, or M AlZr-layered double hydroxide. Chinese Invention Patent Application Publication No. 104707571A discloses a conventional method of preparing aluminum salts and magnesium salts for phosphate removal and slow release of phosphate thereafter. Such conventional method includes: immersing bio-templates into a solution containing aluminum salts and magnesium salts for a period of time; filtering the solution to obtain a cake; cleansing the cake sufficiently using distilled water and ethanol; and calcining the cake under 100° C. to 800° C. for 1 to 48 hours. The bio-templates may be, for example, *Ageratina adenophora*, *Pontederia crassipes*, or *Phragmites australis* leaves. The aluminum salt may be, for example, aluminum chloride, aluminum nitrate, aluminum sulfate, or aluminum acetate. The magnesium salt may be, for example, magnesium chloride, magnesium nitrate, magnesium sulfate, or magnesium acetate.

SUMMARY

Therefore, an object of the disclosure is to provide a novel calcined hierarchical porous composite that can provide another solution for phosphate removal, and furthermore, phosphate recycling.

According to a first aspect of the disclosure, there is provided a calcined hierarchical porous composite for removal of phosphate from water. The calcined hierarchical porous composite includes a carbon-based material, a bio-carrier material, and a layered double hydroxide. The carbon-based material is selected from the group consisting of graphene oxide, reduced graphene oxide, and a combination thereof. The bio-carrier material includes biflavonoid and triterpenoid, and is configured for carrying the carbon-based material therein so as to form a precursor structure. The layered double hydroxide has a plurality of phosphate-specific active sites, and is formed on the precursor structure.

According to a second aspect of the disclosure, there is provided a method for making a calcined hierarchical porous composite. The method includes the steps of:
a) preparing a carbon-based material selected from the group consisting of graphene oxide, reduced graphene oxide, and a combination thereof;
b) preparing a bio-carrier material configured for carrying the carbon-based material therein, and including biflavonoid and triterpenoid;
c) mixing the carbon-based material with the bio-carrier material to permit the carbon-based material to be carried in the bio-carrier material so as to form a precursor structure; and
d) forming a layered double hydroxide on the precursor structure, the layered double hydroxide having phosphate-specific active sites; and
e) subjecting the precursor structure formed with the layered double hydroxide to calcination.

DETAILED DESCRIPTION

In this disclosure, a calcined hierarchical porous composite in accordance with some embodiments is provided for removal of phosphate from water. The calcined hierarchical porous composite includes a carbon-based material, a bio-carrier material, and a layered double hydroxide. The carbon-based material is selected from the group consisting of graphene oxide, reduced graphene oxide, and a combination thereof. The bio-carrier material includes biflavonoid and triterpenoid, and is configured for carrying the carbon-based material therein so as to form a precursor structure. The layered double hydroxide has a plurality of phosphate-specific active sites, and is formed on the precursor structure.

In some embodiments, the water may be, for example, but is not limited to, domestic wastewater or industrial wastewater. The phosphate may be, for example, but is not limited to, inorganic phosphate. The inorganic phosphate may be, for example, but are not limited to, sodium dihydrogen phosphate, sodium hydrogen phosphate, sodium phosphate, etc.

In some embodiments, the carbon-based material may be grown in situ and carried in the bio-carrier material. Graphene oxide and reduced graphene oxide may be those known in the art. In some embodiments, the carbon-based material is graphene oxide.

The biflavonoid and triterpenoid may be intercalated into the layered double hydroxide to enlarge the interlayer distance between layers of the layered double hydroxide. The enlarged interlayer distance facilitates entrance of phosphate in the water between the layers of the layered double hydroxide so as to permit the phosphate to react with and adsorb on the phosphate-specific active sites of the layered double hydroxide. Therefore, the calcined hierarchical porous composite may have a relatively high adsorption selectivity to phosphate. In addition, lone-pair electrons of biflavonoid and triterpenoid may also react with phosphate, so that the adsorption selectivity of the calcined hierarchical porous composite to phosphate may be further improved. In some embodiments, the bio-carrier material may be, for example, leaf powders obtained from plants. Since leaf powders are natural products and are convenient to acquire, they have a cost advantage. Additionally, because leaf powders have a hierarchical porous structure, they have a large amount of surface area, and more layered double hydroxides can be carried thereby. As such, the calcined hierarchical porous composite of this disclosure may have more phosphate-specific active sites, and thus may have improved adsorption efficiency for phosphate. Moreover, due to the porous characteristic of leaf powders, the calcined hierarchical porous composite thus formed may have a plurality of pores so that phosphate ions may easily access and react with the phosphate-specific active sites.

In view of the above, a leaf powder including biflavonoid and triterpenoid may be used for producing the calcined hierarchical porous composite. In some embodiments, the bio-carrier material may include the leaf powder, such as, but is not limited to, *Garcinia subelliptica* leaf powder or other suitable leaf powder. In addition, because the *Garcinia subelliptica* leaf powder is inherently antimicrobial, the calcined hierarchical porous composite thus obtained using the *Garcinia subelliptica* leaf powder is conferred with an antimicrobial property as well.

In some embodiments, the layered double hydroxide may be grown in situ on the bio-carrier material. The layered double hydroxide may be those known in the art. The layered double hydroxide may be, for example, but are not limited to, M Mn-layered double hydroxide, MgFe-layered double hydroxide, MgAl-layered double hydroxide, ZnFe-layered double hydroxide, FeAl-layered double hydroxide, ZnFe-layered double hydroxide, ZnAl-layered double hydroxide, or other suitable materials. In some embodiments, the layered double hydroxide is MgMn-layered double hydroxide.

A method for manufacturing the calcined hierarchical porous composite in accordance with some embodiments of this disclosure includes the following steps: a) preparing a carbon-based material selected from the group consisting of graphene oxide, reduced graphene oxide, and a combination thereof; b) preparing a bio-carrier material configured for carrying the carbon-based material therein, and including biflavonoid and triterpenoid; c) mixing the carbon-based material with the bio-carrier material to permit the carbon-based material to be carried in the bio-carrier material so as to form a precursor structure; d) forming a layered double hydroxide on the precursor structure, the layered double hydroxide having phosphate-specific active sites; and e) subjecting the precursor structure formed with the layered double hydroxide to calcination.

The carbon-based material and the bio-carrier material are the same as those of the aforementioned. In some embodiments, step d) includes sub-steps of: d1) mixing the precursor structure with a basic solution to obtain a suspension; and d2) adding dropwise a metal salt solution to the suspension so as to form the layered double hydroxide on the precursor structure. The metal salt solution includes at least two different metal salts. The metal salts may be, for example, but are not limited to, iron salt, magnesium salt, aluminum salt, manganese salt, or zinc salt, or other suitable salts. The iron salt may be, for example, but is not limited to, ferric nitrate ($Fe(NO_3)_3$). The magnesium salt may be, for example, but is not limited to, magnesium chloride ($MgCl_2$). The aluminum salt may be, for example, but is not limited to, aluminum nitrate ($Al(NO_3)_3$). The manganese salt may be, for example, but is not limited to, manganese (II) chloride ($MnCl_2$). The zinc salt may be, for example, but is not limited to, zinc nitrate ($Zn(NO_3)_2$). In some embodiments, the metal salt solution may include, but are not limited to, magnesium chloride and manganese chloride. The basic solution may include, for example, but are not limited to, sodium hydroxide, sodium carbonate ($Na_2CO_3$), or other suitable materials. In some embodiments, in step e), calcination is implemented under a temperature ranging from 250° C. to 350° C.

Examples of the disclosure will be described hereinafter. It is to be understood that these examples are exemplary and explanatory and should not be construed as a limitation to the disclosure.

Preparative Example 1

First, 3 g of 325 mesh graphite powder and 12 mL of sulfuric acid solution were mixed to form a first mixture solution. The sulfuric acid solution included sulfuric acid, water, 2.5 g of potassium persulfate ($K_2S_2O_8$), and 2.5 g of phosphorus pentoxide ($P_2O_5$). Next, the first mixture solution was heated to and kept at 80° C. for reaction for 4.5 hours. Then, the first mixture solution was cooled to room temperature, and was diluted using 0.5 L of deionized water to form a second mixture solution. Deionized water was added into the second mixture solution to form a precipitate, and then a supernatant was removed. The addition of deionized water and removal of the supernatant was repeated several times, until pH of the second mixture solution reached a neutral value. Thereafter, the second mixture solution was filtered through a 0.2 μm nylon 66 membrane filter to collect a cake. The cake was dried overnight under room temperature to obtain a dried substance. The dried substance and 120 mL of sulfuric acid solution were mixed in an ice bath. Then, 15 g of potassium permanganate ($KMnO_4$) was slowly added into the sulfuric acid solution and stirred under 20° C. to obtain a mixture. The mixture was kept at 35° C. for reaction for 2 hours, and then, 250 mL of deionized water was added whilst keeping the temperature below 5° C. to prevent the danger of massive heat release. Thereafter, the mixture was continuously stirred for 2 hours, and then, 0.7 L of deionized water and 20 mL of 30 wt % hydrogen peroxide aqueous solution were sequentially added to form a bright yellow mixture. The bright yellow mixture was filtered to obtain a cake, which was cleaned using 1 L of 5 wt % hydrochloric acid aqueous solution so as to remove unreacted materials. Subsequently, the cake was cleaned using 1 L of deionized water to remove the remainder of hydrochloric acid, thereby obtaining a refined cake. The refined cake was dried under room temperature for several days so as to obtain a graphene oxide powder. Subsequently, 200 mg of the graphene oxide powder and 200 mL of deionized water were mixed to form a graphene oxide suspension.

Preparative Example 2

First, 10 g of *Garcinia subelliptica* leaves were immersed in 500 mL of 95% ethanol aqueous solution to form a mixture solution. Then, the mixture solution was subjected to ultrasonic vibration for 2 hours at 40 kHz using an ultrasonic cleaner (Manufacturer: Branson Ultrasonics Corporation; Model: Bransonic M2800). Subsequently, the mixture solution was dried under 70° C. to remove ethanol therefrom, such that processed *Garcinia subelliptica* leaves were obtained. Thereafter, a planetary ball mill (Manufacturer: FRITSCH; Model.: PULVERISETTE 6 classic line; diameters of grinding balls: 1 mm to mm) was used to grind the processed *Garcinia subelliptica* leaves such that a *Gar-*

*cinia subelliptica* leaf powder having an average powder size of 0.1 mm was obtained.

Example 1 (EX 1)—Calcined Hierarchical Porous Composite

First, 400 mg of the *Garcinia subelliptica* leaf powder of Preparative Example 2 was added into 200 mL of the graphene oxide suspension of Preparative Example 1 to obtain a suspension. The suspension was added into 200 mL of a basic solution so as to form a mixture solution. The basic solution included sodium hydroxide, sodium carbonate, and water. The concentrations of sodium hydroxide and sodium carbonate in the basic solution were 0.2 M and 0.1 M, respectively. Thereafter, 200 mL of a metal salt solution was added dropwise into the mixture solution. The metal salt solution included magnesium chloride, manganese chloride, and water. In the metal salt solution, the magnesium chloride (146 mg) had a concentration of 0.03 M and the manganese chloride (110 mg) had a concentration of 0.01 M. After addition of the metal salt solution, the mixture solution was stirred for 4 hours, followed by filtration to obtain a coarse cake. The coarse cake was then cleaned by deionized water until the effluent thereof was neutral, thereby obtaining a refined cake. The refined cake was subjected to a freeze-dried process to obtain a powder-like composite with a Mg:Mn ratio of 3:1 in the layered double hydroxide thereof. The composite was subsequently placed in an environment containing oxygen to calcine at 300° C. for 4 hours, so as to obtain a calcined hierarchical porous composite containing 30 wt % of the *Garcinia subelliptica* leaf powder and 15 wt % of the graphene oxide.

Example 2 (EX 2)

A calcined hierarchical porous composite of EX 2 was prepared and evaluated according to the procedures and conditions employed for preparing and evaluating the calcined hierarchical porous composite of EX 1, except that the calcined hierarchical porous composite of EX 2 was prepared on a day different than that of EX 1.

Comparative Example 1 (CE 1)

First, 200 mL of the graphene oxide suspension of Preparative Example 1 was added into 200 mL of a basic solution to form a mixture solution. The basic solution included sodium hydroxide, sodium carbonate, and water. The concentrations of sodium hydroxide and sodium carbonate in the basic solution were 0.2 M and 0.1 M, respectively. Next, 200 mL of a metal salt solution was added dropwise into the mixture solution. The metal salt solution included magnesium chloride, manganese chloride, and water. The concentrations of magnesium chloride and manganese chloride in the metal salt solution were 0.03 M and 0.01 M, respectively. After addition of the metal salt solution, the mixture solution was stirred for 4 hours, followed by filtration to obtain a coarse cake. The coarse cake was then cleaned using deionized water until the effluent thereof was neutral, thereby obtaining a refined cake. The refined cake was subjected to a freeze-dried process in order to obtain a powder-like composite with a Mg:Mn ratio of 3:1 in the layered double hydroxide thereof. The composite was subsequently placed in an environment containing oxygen to calcine at 300° C. for 4 hours to obtain a calcined composite in which the graphene oxide was present in an amount of 20 wt %.

Comparative Example 2 (CE 2)

A calcined composite of CE 2 was prepared according to the procedures and conditions employed for preparing the calcined composite of CE 1, except that the calcined composite of CE 2 was prepared on a day different than that of CE 1.

Comparative Example 3 (CE 3)

First, 400 mg of the *Garcinia subelliptica* leaf powder of Preparative Example 2 was added into 200 mL of a basic solution to form a mixture solution. The basic solution included sodium hydroxide, sodium carbonate, and water. The concentrations of sodium hydroxide and sodium carbonate in the basic solution were 0.2 M and 0.1 M, respectively. Next, 200 mL of a metal salt solution was added dropwise into the mixture solution. The metal salt solution included magnesium chloride, manganese chloride, and water. The concentrations of magnesium chloride and manganese chloride in the metal salt solution were 0.03 M and 0.01 M, respectively. After addition of the metal salt solution, the mixture solution was stirred for 4 hours, followed by filtration to obtain a coarse cake. The coarse cake was then cleaned using deionized water until the effluent thereof was neutral, thereby obtaining a refined cake. The refined cake was subjected to a freeze-dried process in order to obtain a powder-like composite with a Mg:Mn ratio of 3:1 in the layered double hydroxide thereof. The composite was subsequently placed in an environment containing oxygen to calcine at 300° C. for 4 hours to obtain a calcined composite in which the *Garcinia subelliptica* leaf powder was present in an amount of 30 wt %.

Property Evaluation

Test 1: Phosphate Adsorption Capacity

A plurality of disodium phosphate ($Na_2HPO_4$) solutions with different phosphate concentrations were provided as standard solutions, and an ion chromatography instrument was used for measuring the chromatographic peaks of the standard solutions, so as to obtain a plurality of integrated peak areas of phosphate that correspond to the phosphate concentrations of the standard solutions. A standard curve could thus be determined by the phosphate concentrations and the obtained integrated peak areas of phosphate of the standard solutions. The ion chromatography instrument was an ion chromatography system (Manufacturer: Dionex; Model: ICS-1000), which included an ion chromatography subsystem (Manufacturer: Dionex; Model: Aquion™) and a column (4 mm×250 mm) (Manufacturer: Dionex; Model: IonPac™ AS14). An eluent of the column included sodium carbonate, sodium hydrogen carbonate, and water. The concentrations of sodium carbonate and sodium hydrogen carbonate in the eluent were 70 mM and 20 mM, respectively. The injection volume of the standard solution was 25 μL, and the eluent had a flow rate of 1 mL/min.

Example 3 (EX 3)

First, 50 mg of the calcined hierarchical porous composite of EX 1 was immersed in 200 mL of a phosphate solution to obtain a test sample. The phosphate solution included disodium phosphate and water. The concentration of disodium phosphate in the phosphate solution was 50 mg/L. The test sample was then stirred at a speed of 250 rpm for 1.5 h. Thereafter, the composite was removed from the test sample, and the change in phosphate concentration was evaluated. The phosphate concentrations before and after stirring were measured according to the procedures described in the section, entitled "Test 1: Phosphate adsorption capacity" of the Property Evaluation. By obtaining integrated peak areas of phosphate of the test sample before and after the stirring, the abovementioned standard curve can be determined, so that the phosphate concentrations of the test sample before and after the stirring can be calculated, i.e., obtaining a quantity A (mg) of phosphate in the test sample before the stirring, and a quantity B (mg) of phosphate in the phosphate solution after the stirring. Therefore, adsorption capacity of phosphate can be calculated as such:

$$\text{Adsorption capacity of phosphate}(mg-P/g) = \frac{A-B}{\text{weight of the composite }(g)}.$$

The stirring time, stirring speed, and the calculated phosphate adsorption capacity for the test sample of EX 3 are listed in Table 1.

Examples 4 to 7 (EX 4 to EX 7)

In each of EX 4 to EX 7, a test sample was prepared and evaluated according to the procedures and conditions employed for preparing and evaluating the test sample of EX 3, except that the stirring time was different. The stirring time, stirring speed, and the calculated adsorption capacity of the phosphate for each of the test samples of EX 4 to EX 7 are listed in Table 1.

Example 8 (EX 8)

A test sample of EX 8 was prepared and evaluated according to the procedures and conditions employed for preparing and evaluating the test sample of EX 3, except that, in EX 8, 35 mg of the calcined hierarchical porous composite of EX 2 was used to replace the calcined hierarchical porous composite of EX 1, and that the test sample was stirred at a speed ranging from 300 rpm to 400 rpm for 12 h. The stirring time, stirring speed, and the calculated adsorption capacity of the phosphate for the test sample of EX 8 are listed in Table 1.

Comparative Example 4 (CE 4)

A test sample of CE 4 was prepared and evaluated according to the procedures and conditions employed for preparing and evaluating the test sample of EX 3, except that, in CE 4, 50 mg of the calcined composite of CE 1 was used to replace the calcined hierarchical porous composite of EX 1. The stirring time, stirring speed, and the calculated adsorption capacity of the phosphate for the test sample of CE 4 are listed in Table 1.

Comparative Examples 5 to 8 (CE 5 to CE 8)

In each of CE 5 to CE 8, a test sample was prepared and evaluated according to the procedures and conditions employed for preparing and evaluating the test sample of CE 4, except that the stirring time was different. The stirring time, stirring speed, and the calculated adsorption capacity of the phosphate for each of the test samples of CE 5 to CE 8 are listed in Table 1.

Comparative Example 9 (CE 9)

A test sample of CE 9 was prepared and evaluated according to the procedures and conditions employed for preparing and evaluating the test sample of CE 4, except that, in CE 9, 35 mg of the calcined composite of CE 2 was used to replace the calcined composite of CE 1, and that the test sample was stirred at a speed ranging from 300 rpm to 400 rpm for 12 h. The stirring time, stirring speed, and the calculated adsorption capacity of the phosphate for the test sample of CE 9 are listed in Table 1.

Comparative Example 10 (CE 10)

A test sample of CE 10 was prepared and evaluated according to the procedures and conditions employed for preparing and evaluating the test sample of CE 9, except that, in CE 10, 35 mg of the calcined composite of CE 3 was used to replace the calcined hierarchical porous composite of CE 2. The stirring time, stirring speed, and the calculated adsorption capacity of the phosphate for the test sample of CE 10 are listed in Table 1.

It should be noted that, measurement of the adsorption capacity of phosphate of the composites of CE 2 and CE 3 were performed in August 2020, and measurement of the adsorption capacity of phosphate of the composites of EX 1 and CE 1 were performed earlier than January 2019.

TABLE 1

| Test no. | Example | Test sample Composite | Stirring time (h) | Stirring speed (rpm) | Phosphate adsorption capacity (mg-P/g) |
|---|---|---|---|---|---|
| 1 | EX 3 | EX 1 | 1.5 | 250 | 74.2 |
|  | 4 |  | 3 |  | 95.3 |
|  | 5 |  | 6 |  | 253.5 |
|  | 6 |  | 15 |  | 221.2 |
|  | 7 |  | 24 |  | 244.08 |
|  | 8 | EX 2 | 12 | 300-400 | 144.6 |
|  | CE 4 | CE 1 | 1.5 | 250 | 32.1 |
|  | 5 |  | 3 |  | 35 |
|  | 6 |  | 6 |  | 39 |
|  | 7 |  | 15 |  | 43.2 |
|  | 8 |  | 24 |  | 44.5 |
|  | 9 | CE 2 | 12 | 300-400 | 64 |
|  | 10 | CE 3 |  |  | 90.2 |

Referring to Table 1, the test samples of EX 3 to EX 8 (prepared using the calcined hierarchical porous composites of EX 1 and EX 2) show an excellent phosphate adsorption capacity compared to that of the test samples of CE 4 to CE 9 (prepared using the calcined composite without the *Garcinia subelliptica* leaf powder, i.e., CE 1 and CE 2) and test sample CE 10 (prepared using the calcined composite without the graphene oxide, i.e., CE 3). In particular, when the test samples of EX 7 and CE 8 were stirred at a higher speed (250 rpm) for 24 hours, the phosphate adsorption capacity of the test sample of EX 7 is about 5 times higher compared with the phosphate adsorption capacity of the test sample of CE 8. Furthermore, when the test samples of EX 8, CE 9 and CE 10 were stirred at a speed ranging from 300 rpm to 400 rpm for 12 hours, the phosphate adsorption capacity of the test sample of EX 8 is at least 1.6 times higher compared with the phosphate adsorption capacities of the test samples of CE 9 and CE 10. Therefore, it may be concluded that the introduction of both the *Garcinia subelliptica* leaf powder and the graphene oxide in the calcined hierarchical porous composite is useful for improving the phosphate adsorption capacity.

Test 2: Phosphate Desorption Rate

Example 9 (EX 9)

To evaluate phosphate desorption, 10 mg of the calcined hierarchical porous composite of EX 2, which was removed from the test sample of EX 8 after stirring for 12 hours, was immersed in 50 mL of a regeneration solution and then sonicated for 6 hours using an ultrasonic instrument to obtain a mixture. The regeneration solution included sodium chloride, sodium hydroxide, and water. The concentrations of sodium chloride and sodium hydroxide in the regeneration solution were both 0.1 M. After sonification, the calcined hierarchical porous composite was removed from the mixture to obtain a treated solution. The phosphate concentrations in the regeneration solution and the treated solution were evaluated according to the procedures and conditions employed for evaluating the test sample of EX 3, thereby obtaining a quantity C (mg) of phosphate in the regeneration solution, and a quantity D (mg) of phosphate in the treated solution. The phosphate desorption capacity can therefore be calculated as such:

$$\text{Phosphate desorption capacity(mg} - P/g) = \frac{C - D}{\text{weight of the composite } (g)}.$$

The phosphate desorption rate can therefore be calculated as such:

$$\text{Phosphate desorption rate (\%)} = \frac{\text{Adsorption capacity of phosphate} - \text{Desorption capacity of phosphate}}{\text{Adsorption capacity of phosphate}} \times 100\%.$$

The calculated desorption rate of the phosphate for the calcined hierarchical porous composite of EX 2 after being treated in EX 9 is listed in Table 2.

Comparative Example 11 (CE 11)

First, 10 mg of the calcined composite of CE 2 was removed from the test sample of CE 9 after stirring, and then, the phosphate was separated from the calcined composite of CE 2 using a regeneration solution in a manner similar to that in EX 9 so as to obtain a treated solution. The regeneration solution and the treated solution were evaluated according to the procedures and conditions employed for evaluating the regeneration solution and the treated solution in EX 9. The calculated desorption rate of the phosphate for the calcined composite of CE 2 after being treated in CE 11 is listed in Table 2.

Comparative Example 12 (CE 12)

First, 10 mg of the calcined composite of CE 3 was removed from the test sample of CE 10 after stirring, and then, the phosphate was separated from the calcined composite of CE 3 using a regeneration solution in a manner similar to that in EX 9 so as to obtain a treated solution. The regeneration solution and the treated solution were evaluated according to the procedures and conditions employed for evaluating the regeneration solution and the treated solution in EX 9. The calculated desorption rate of the phosphate for the calcined composite of CE 3 after being treated in CE 12 is listed in Table 2.

Test 3: Phosphate Adsorption Capacity Under Different pH

Example 10 (EX 10)

Disodium phosphate and 200 mg of deionized water were mixed to prepare a disodium phosphate solution.

The concentration of disodium phosphate in the disodium phosphate solution was 50 ppm, and the disodium phosphate solution had a pH value of 7. Thereafter, 10 mg of the calcined hierarchical porous composite of EX 1 was immersed in the disodium phosphate solution to obtain a test sample. The test sample was stirred for 6 hours using an agitator with a rotational speed ranging from 300 rpm to 400 rpm to obtain a treated sample. Then, 10 mL of the treated sample was evaluated according to the procedures and conditions employed for evaluating the test sample of EX 3. The pH value of the disodium phosphate solution and the calculated adsorption capacity of the phosphate for the treated sample of EX 10 are listed in Table 2.

Example 11 (EX 11)

A treated sample of EX 11 was prepared and evaluated according to the procedures and conditions employed for preparing and evaluating the treated sample of EX 10, except that, in EX 11, the pH value of the disodium phosphate solution was adjusted to 11 by adding sodium hydroxide thereinto. The pH value of the disodium phosphate solution and the calculated adsorption capacity of the phosphate for the treated sample of EX 11 are listed in Table 2.

Comparative Example 13 (CE 13)

A treated sample of CE 13 was prepared and evaluated according to the procedures and conditions employed for preparing and evaluating the treated sample of EX 10, except that, in CE 13, 10 mg of the calcined composite (CE 1) was used to replace the calcined hierarchical porous composite of EX 1. The pH value of the disodium phosphate solution and the calculated adsorption capacity of the phosphate for the treated sample of CE 13 are listed in Table 2.

TABLE 2

| Test no. | Example | Composite | pH | Phosphate adsorption capacity (mg-P/g) | Phosphate desorption rate (%) |
|---|---|---|---|---|---|
| 2 | EX 9 | EX 2 | — | — | 85.6 |
|   | CE 11 | CE 2 | — | — | 2.3 |
|   | CE 12 | CE 3 | — | — | 3.9 |
| 3 | EX 10 | EX 1 | 7 | 244.1 | — |
|   | EX 11 | EX 1 | 11 | 42.2 | — |
|   | CE 13 | CE 1 | 7 | 44.5 | — |

—: Not measured

Referring to Table 2, in test 2, the treated sample of EX 9 (prepared using the calcined hierarchical porous composite, i.e., EX 2) has an excellent phosphate desorption ability compared with the treated samples of CE 11 (prepared using the calcined composite without the Garcinia subelliptica leaf powder, i.e., CE 2) and CE 12 (prepared using the calcined composite without the graphene oxide, i.e., CE 3). For example, the phosphate desorption rate of the treated sample of EX 9 shows improvement about 21.9 times improved compared with the phosphate desorption rate of the treated sample of CE 12. Therefore, it may be concluded that the introduction of both the *Garcinia subelliptica* leaf powder and the oxide graphene in the calcined hierarchical porous composite is useful for improving the phosphate desorption rate.

In addition, in test 3, the treated sample of EX 10 (prepared using the calcined hierarchical porous composite, i.e., EX 1) has excellent phosphate adsorption capacity compared with the treated sample of CE 13 (prepared using the calcined composite without the *Garcinia subelliptica* leaf powder, i.e., CE 1) under a neutral pH environment. On the other hand, by comparing the treated samples of EX 10 and EX 11, it can be found that the pH environment may affect the phosphate adsorption capacity of the calcined hierarchical porous composite of EX 1.

Test 4: Antimicrobial Property

Antimicrobial property of the composites against *Escherichia coli* (*E. coli*) were tested using the Kirby-Bauer disk diffusion method.

Example 12 (EX 12)

*E. coli* was incubated in Luria Broth (LB) medium and shaken under 200 rpm at 37° C. for 24 hours, followed by dilution of the cultured media to a concentration of $10^6$ cfu/mL using additional LB medium to obtain a bacterial solution containing *E. coli*. The calcined hierarchical porous composite of EX 1 was mixed with water to obtain a mixture in which the concentration of the calcined hierarchical porous composite of EX 1 was 0.75 wt %. The mixture was then added to filter papers, and was placed on a LB agar plate applied with the bacterial solution. Then, the LB agar plate was placed in an incubator at 37° C. for 24 hours, followed by measuring the diameter of a growth inhibition zone formed on the LB agar plate. The result is listed in Table 3.

Example 13 (EX 13)

A mixture of EX 13 was prepared and evaluated according to the procedures and conditions employed for preparing and evaluating the mixture of EX 12, except that, in EX 13, the concentration of the calcined hierarchical porous composite of EX 1 was 1.0 wt %. The measured diameter of the growth inhibition zone for the mixture of EX 13 is listed in Table 3.

Comparative Example 14 (CE 14)

A mixture of CE 14 was prepared and evaluated according to the procedures and conditions employed for preparing and evaluating the mixture of EX 12, except that, in CE 14, the calcined composite of CE was used to replace the calcined hierarchical porous composite of EX 1. The measured diameter of the growth inhibition zone for the mixture of CE 14 is listed in Table 3.

Comparative Example 15 (CE 15)

A mixture of CE 15 was prepared and evaluated according to the procedures and conditions employed for preparing and evaluating the mixture of CE 14, except that, in CE 15, the concentration of the calcined composite of CE 1 was 1.0 wt %. The measured diameter of the growth inhibition zone for the mixture of CE 15 is listed in Table 3.

TABLE 3

| Test no. | Example | Mixture Composite | Composite Concentration (wt %) | Growth inhibition zone diameter (mm) |
|---|---|---|---|---|
| 4 | EX 12 | EX 1 | 0.75 | 5.37 |
|   | EX 13 | EX 1 | 1.0 | 5.63 |
|   | CE 14 | CE 1 | 0.75 | 4.57 |
|   | CE 15 | CE 1 | 1.0 | 4.03 |

Referring to Table 3, the mixtures of EX 12 and

EX 13 (prepared using the calcined hierarchical porous composite, i.e., EX 1) have better antimicrobial property (larger inhibition zone diameter) compared with the mixtures of CE 14 and CE 15 (prepared using the calcined composite without the *Garcinia subelliptica* leaf powder, i.e., CE 1). For example, when the concentration of the composite of EX 1 is 0.75 wt %, the growth inhibition zone diameter formed on the LB agar plate of EX 12 is 0.8 mm more than the inhibition zone diameter formed on the LB agar plate of CE 14. Therefore, it may be concluded that the calcined hierarchical porous composite of EX 1 is conferred with additional antimicrobial property due to the introduction of the *Garcinia subelliptica* leaf powder therein.

In view of the aforesaid, through the inclusion of the carbon-based material, the bio-carrier material, and the layered double hydroxide, the calcined hierarchical porous composite of this disclosure is conferred with the ability to adsorb phosphate effectively so as to remove phosphate from water, thereby reducing the negative environmental impact of phosphate, and after adsorption of phosphate, the calcined hierarchical porous composite can desorb phosphate, so that phosphate can be recycled to be used.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A calcined hierarchical porous composite for removal of phosphate in water, comprising:
   a calcined carbon-based material selected from the group consisting of calcined graphene oxide, calcined reduced graphene oxide, and a combination thereof;
   a calcined solid bio-carrier material including biflavonoid and triterpenoid, and configured for carrying said calcined carbon-based material therein so as to form a calcined precursor structure; and
   a calcined layered double hydroxide having phosphate-specific active sites, and formed on calcined solid precursor structure, wherein calcination to obtain the calcined hierarchical porous composite is implemented under a temperature ranging from 250° C. to 350° C.

2. The calcined hierarchical porous composite according to claim 1, wherein said calcined solid bio-carrier material includes a calcined *Garcinia subelliptica* leaf powder.

3. The calcined hierarchical composite according to claim 1, wherein said calcined carbon-based material is calcined graphene oxide.

4. The calcined hierarchical porous composite according to claim 1, wherein said calcined layered double hydroxide includes ions of magnesium and manganese.

5. A method for making a calcined hierarchical porous composite, comprising the steps of:
   a) preparing a carbon-based material selected from the group consisting of graphene oxide, reduced graphene oxide, and a combination thereof;
   b) preparing a solid bio-carrier material configured for carrying the carbon-based material therein, and including biflavonoid and triterpenoid;
   c) mixing the carbon-based material with the bio-carrier material to permit the carbon-based material to be carried in the bio-carrier material so as to form a precursor structure;
   d) forming a layered double hydroxide on the precursor structure, the layered double hydroxide having phosphate-specific active sites; and
   e) subjecting the precursor structure formed with the layered double hydroxide to calcination, wherein step e) is implemented under a temperature ranging from 250° C. to 350° C.

6. The method according to claim 5, wherein, the carbon-based material is graphene oxide.

7. The method according to claim 5, wherein the bio-carrier material includes a *Garcinia subelliptica* leaf powder.

8. The method according to claim 5, wherein step d) includes the sub-steps of:
   d1) mixing the precursor structure with a basic solution to obtain a suspension; and
   d2) adding dropwise a metal salt solution to the suspension so as to form the layered double hydroxide on the precursor structure.

9. The method according to claim 8, wherein the metal salt solution includes at least two different metal salts.

* * * * *